(12) United States Patent
Reyes et al.

(10) Patent No.: US 10,439,963 B2
(45) Date of Patent: Oct. 8, 2019

(54) INCREASING CAPACITY IN A TOPIC-SUBSCRIPTION MESSAGING SYSTEM

(71) Applicant: Citrix Systems, Inc., Fort Lauderdale, FL (US)

(72) Inventors: Jose Reyes, Deerfield Beach, FL (US); Thomas Michael Kludy, Cooper City, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 313 days.

(21) Appl. No.: 15/454,486

(22) Filed: Mar. 9, 2017

(65) Prior Publication Data

US 2018/0262450 A1    Sep. 13, 2018

(51) Int. Cl.
*H04L 12/58*    (2006.01)

(52) U.S. Cl.
CPC .............. *H04L 51/04* (2013.01); *H04L 51/14* (2013.01)

(58) Field of Classification Search
None
See application file for complete search history.

(56) References Cited

U.S. PATENT DOCUMENTS

| 9,471,331 | B2 | 10/2016 | Kludy et al. |
| 9,703,581 | B2 | 7/2017 | Duchastel et al. |
| 9,819,538 | B2 | 11/2017 | Kludy et al. |
| 2006/0047666 | A1* | 3/2006 | Bedi ...................... G06F 16/958 |
| 2008/0010301 | A1* | 1/2008 | Tian ........................ H04L 67/24 |
| 2009/0187570 | A1* | 7/2009 | Postlethwaite ... G06F 16/90344 |
| 2011/0289163 | A1* | 11/2011 | Edwards ................. G06F 9/542 |
|  |  |  | 709/206 |
| 2014/0344232 | A1 | 11/2014 | Kludy |

\* cited by examiner

*Primary Examiner* — Younes Naji
(74) *Attorney, Agent, or Firm* — BainwoodHuang (57) ABSTRACT

A technique increases capacity in a topic-subscription messaging system. The technique involves, during a first time period, operating a first topic structure of the system. The first topic structure includes a first topic and a plurality of first subscriptions coupled with the first topic. The technique further involves, during a second time period, providing a second topic structure which includes a second topic and a plurality of second subscriptions coupled with the second topic. The technique further involves, during a third time period, providing a link from the second topic structure to the first topic structure making (i) the second topic structure a parent to the first topic structure and (ii) the first topic structure a child to the second topic structure, the link conveying messages from a particular second subscription of the second topic structure to the first topic of the first topic structure.

20 Claims, 8 Drawing Sheets

INCREASING CAPACITY IN A TOPIC-SUBSCRIPTION MESSAGING SYSTEM

BACKGROUND

A conventional publish/subscribe messaging architecture includes publishers and subscribers. In such a messaging architecture, the publishers do not have any specific subscriber knowledge and thus do not send messages directly to the subscribers. Rather, the publishers publish messages to intermediaries, and the subscribers await receipt of (or listen for) the published messages from the intermediaries.

In a conventional publish/subscribe messaging architecture that is topic-based, a publisher publishes (or posts) messages to a topic. Here, the subscribers that subscribe to that topic receive the messages that are posted to that topic.

SUMMARY

One embodiment is directed to a method of increasing capacity in a topic-subscription messaging system. The method includes, during a first period of time, operating a first topic-subscription structure of the topic-subscription messaging system. The first topic-subscription structure includes a first topic and a plurality of first subscriptions coupled with the first topic. The first topic-subscription structure conveys messages received by the first topic to each first subscription of the plurality of first subscriptions coupled with the first topic. The method further includes, during a second period of time after the first period of time, providing a second topic-subscription structure. The second topic-subscription structure includes a second topic and a plurality of second subscriptions coupled with the second topic. The second topic-subscription structure conveys messages received by the second topic to each second subscription of the plurality of second subscriptions coupled with the second topic. The method further includes, during a third period of time after the second period of time, providing a link from a particular second subscription of the second topic-subscription structure to the first topic of the first topic-subscription structure making (i) the second topic-subscription structure a parent to the first topic-subscription structure and (ii) the first topic-subscription structure a child to the second topic-subscription structure, the link conveying messages from the particular second subscription of the second topic-subscription structure to the first topic of the first topic-subscription structure.

In some arrangements, operating the first topic-subscription structure of the topic-subscription messaging system during the first time period includes receiving, by the first topic-subscription structure, a particular message from a sender device, and distributing, by the first topic-subscription structure, copies of the particular message through each first subscription of the first topic-subscription structure.

In some arrangements, distributing the copies of the particular message through each first subscription of the plurality of first subscriptions includes, for each first subscription of the plurality of first subscriptions, operating a respective client that (i) listens for messages conveyed to that first subscription and (ii) forwards the messages conveyed to that first subscription to a respective receiver.

In some arrangements, the method further includes, during a fourth period of time after the third period of time, operating the first and second topic-subscription structures of the topic-subscription messaging system to distribute messages from the sender device to a plurality of receivers.

In some arrangements, the method further includes providing a third topic-subscription structure. The third topic-subscription structure includes a third topic and a plurality of third subscriptions coupled with the third topic. The third topic-subscription structure conveys messages received by the third topic to each third subscription of the plurality of third subscriptions coupled with the third topic. In these arrangements, the method further includes providing another link from another second subscription of the second topic-subscription structure to the third topic of the third subscription structure making (i) the second topic-subscription structure a parent to the third topic-subscription structure and (ii) the third topic-subscription structure a child to the second topic-subscription structure. The other link conveys messages from the other second subscription of the second topic-subscription structure to the third topic of the third subscription structure.

In some arrangements, the method further includes providing a third topic-subscription structure, the third topic-subscription structure including a third topic and a plurality of third subscriptions coupled with the third topic, the third topic-subscription structure conveying messages received by the third topic to each third subscription of the plurality of third subscriptions coupled with the third topic. In these arrangements, the method further includes providing another link from a particular third subscription of the third topic-subscription structure to the second topic of the second topic-subscription structure making (i) the third topic-subscription structure a parent to the second topic-subscription structure and (ii) the second topic-subscription structure a child to the third topic-subscription structure. The other link conveys messages from the particular third subscription of the third subscription structure to the second topic of the second topic-subscription structure.

In some arrangements, the method further includes, prior to the third period of time, adding first subscriptions to the first topic-subscription structure while the number of first subscriptions of the first topic-subscription structure is less than or equal to a predefined subscription limit. Each first subscription communicates with a respective client that (i) listens for messages conveyed to that first subscription and (ii) forwards the conveyed messages to a respective receiver.

In some arrangements, providing the link from the particular second subscription of the second topic-subscription structure to the first topic of the first topic-subscription structure includes detecting, as a trigger event to increase capacity in the topic-subscription messaging system, that the number of first subscriptions of the first topic-subscription structure has reached the predefined subscription limit. In these arrangements, the method further includes, in response to the trigger event, operating a client that (i) listens for messages conveyed to the particular second subscription and (ii) forwards the messages conveyed to the particular second subscription to the first topic of the first topic-subscription structure.

Another embodiment is directed to a computer program product having a non-transitory computer readable medium that stores a set of instructions to increase capacity in a topic-subscription messaging system. The set of instructions, when carried out by computerized circuitry, causing the computerized circuitry to perform a method of:

(A) during a first period of time, operating a first topic-subscription structure of the topic-subscription messaging system, the first topic-subscription structure including a first topic and a plurality of first subscriptions coupled with the first topic, the first topic-subscription structure conveying messages received by the first topic to each first subscription of the plurality of first subscriptions coupled with the first topic;

(B) during a second period of time after the first period of time, providing a second topic-subscription structure, the second topic-subscription structure including a second topic and a plurality of second subscriptions coupled with the second topic, the second topic-subscription structure conveying messages received by the second topic to each second subscription of the plurality of second subscriptions coupled with the second topic; and (C) during a third period of time after the second period of time, providing a link from a particular second subscription of the second topic-subscription structure to the first topic of the first topic-subscription structure making (i) the second topic-subscription structure a parent to the first topic-subscription structure and (ii) the first topic-subscription structure a child to the second topic-subscription structure.

The link conveys messages from the particular second subscription of the second topic-subscription structure to the first topic of the first topic-subscription structure.

Yet another embodiment is directed to an electronic apparatus that includes an interface, memory, and control circuitry coupled to the interface and the memory. The memory stores instructions that, when carried out by the control circuitry, cause the control circuitry to:

(A) during a first period of time, operate a first topic-subscription structure of the topic-subscription messaging system, the first topic-subscription structure including a first topic and a plurality of first subscriptions coupled with the first topic, the first topic-subscription structure conveying messages received by the first topic to each first subscription of the plurality of first subscriptions coupled with the first topic, (B) during a second period of time after the first period of time, provide a second topic-subscription structure, the second topic-subscription structure including a second topic and a plurality of second subscriptions coupled with the second topic, the second topic-subscription structure conveying messages received by the second topic to each second subscription of the plurality of second subscriptions coupled with the second topic, and (C) during a third period of time after the second period of time, provide a link from a particular second subscription of the second topic-subscription structure to the first topic of the first topic-subscription structure making (i) the second topic-subscription structure a parent to the first topic-subscription structure and (ii) the first topic-subscription structure a child to the second topic-subscription structure.

The link conveys messages from the particular second subscription of the second topic-subscription structure to the first topic of the first topic-subscription structure.

It should be understood that, in the cloud context, some electronic circuitry involved in particular embodiments is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that are involved in increasing capacity of a topic-subscription messaging system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Improved techniques are directed to increasing capacity of a topic-subscription messaging system to support more receivers. Along these lines, suppose that a topic-subscription messaging system employs a topic-subscription structure having a topic and subscriptions to that topic. During operation, when the topic of the topic-subscription structure receives a message from a sender, a copy of the message is conveyed to each subscription on behalf of a respective receiver. The receivers are thus able to receive copies of the message through the subscriptions.

Further suppose that there is a requirement that the topic-subscription structure has, at most, a predefined maximum limit of subscriptions (e.g., 2000 subscriptions). Since each subscription receives messages from the topic on behalf of a respective receiver, the number of receivers that can receive messages from the topic-subscription structure is capped at the predefined maximum limit as well.

Now, suppose that the topic-subscription structure of the system is at full receiver capacity. That is, suppose that each subscription of topic-subscription structure receives messages on behalf of a receiver and there are no more subscriptions of the topic-subscription structure that are available for use.

One approach to expanding the capacity of the system to support more receivers is to add a child topic-subscription structure to the original topic-subscription structure. To this end, an existing receiver may be displaced from a subscription of the original topic-subscription structure thus making that unhindered subscription available for re-purposing as a channel for messages from the original topic-subscription structure to the topic of the child topic-subscription structure. The displaced receiver is then reconfigured to receive messages from a subscription of the added child topic-subscription structure.

Following such reconfiguration, when the topic of the original topic-subscription structure receives a message, the message (or a copy of the message) is conveyed to all of the subscriptions of the original topic-subscription structure including the subscription that has been re-purposed as a channel to the topic of the child topic-subscription structure. Accordingly, the topic of the child topic-subscription structure then receives the message which is then conveyed to each subscription of the child topic-subscription structure thus enabling the displaced receiver to receive the message.

One should understand that, during such operation, it is possible that the displaced receiver misses one or more messages. For example, while the displaced receiver is disconnected from the system and before the displaced receiver is properly reconnected to the system, the displaced receiver cannot receive any messages from the system. Such operation may be undesirable or even unacceptable particularly if a message of critical importance is potentially missed (e.g., a warning from an emergency service, a message relating to the transfer of a large amount of money, a message withdrawing particular privileges and/or changing security levels, etc.).

An alternative to expanding the capacity of a topic-subscription messaging system by displacing an existing receiver from an original topic-subscription structure to a child topic-subscription structure involves introducing a parent topic-subscription structure ahead of the original topic-subscription structure. Here, a subscription of the parent topic-subscription structure is setup to channel messages sent to the topic of the parent topic-subscription structure to the topic of the original topic-subscription structure.

In this alternative situation, there is no displacement of any existing receivers at any time. Rather, each subscription of the original topic-subscription structure continues to receive messages from the topic of the original topic-subscription structure on behalf of a respective receiver thus avoiding a situation in which a receiver misses a message due to disconnection. Any message that a sender sends to either the topic of the original topic-subscription structure or to the topic of the parent topic-subscription structure is now distributed to all of the receivers. Moreover, with the parent topic-subscription structure now in place, new capacity is available for new receivers, and there is an opportunity to more quickly grow the subscription capacity of system (i.e., exponentially rather than linearly).

Figure 1:
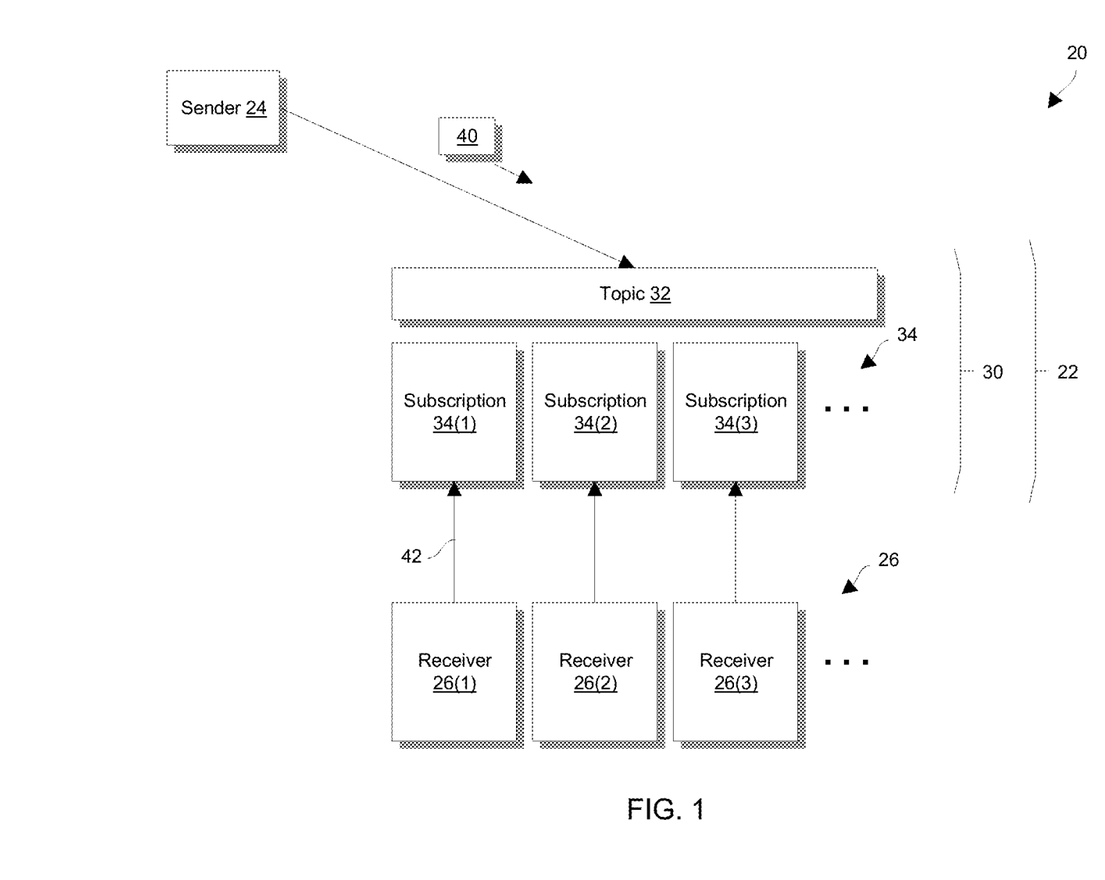
FIG. 1 is a block diagram of an electronic environment that provides topic-subscription messaging in accordance with some example embodiments.

FIG. 1 shows, in accordance with some example embodiments, an electronic environment 20 that provides topic-subscription messaging and supports receiver capacity expansion. The electronic environment 20 includes a topic-subscription messaging system 22, a sender 24, and multiple receivers 26(1), 26(2), 26(3), . . . (collectively, receivers 26). The topic-subscription messaging system 22 has a topic-subscription structure 30 that includes a topic 32 and multiple subscriptions 34(1), 34(2), 34(3), . . . (collectively, subscriptions 34).

It should be understood that the topic-subscription messaging system 22 may include other topic-subscription structures 30 which are introduced over time and that the number of subscriptions 34 permitted in each topic-subscription structure 30 of the system 22 may be limited, i.e., capped at a predefined maximum number of subscriptions 34. This predefined maximum number of subscriptions 34 per topic-subscription structure 30 may be set by the provider of the system 22 and may be any integer greater than 1 such as 50, 100, 1000, 2000, 4000, and so on.

The topic 32 is configured to receive messages 40 from one or more senders 24 and distributes the messages 40 (or copies of the messages 40) to the subscriptions 34. Each message 40 may take the form of a notification containing data within a message payload. In some arrangements, the messages 40 are one-way notifications (e.g., the sender 24 does not receive any acknowledgement of receipt when a subscription 34 receives a message 40).

The receivers 26 are configured to listen for messages 40 at respective subscriptions 34. That is, the receiver 26(1) listens for messages 40 from the subscription 34(1). Likewise, the receiver 26(2) listens for messages 40 from the subscription 34(2), the receiver 26(3) listens for messages 40 from the subscription 34(3), and so on. In some arrangements, the receivers 26 listen directly to the subscriptions 34 while awaiting messages 40. In other arrangements, the receivers 26 utilize separate intermediate listener components (e.g., listener clients) that listen to the subscriptions 34 while awaiting messages 40.

During initial operation, the sender 24 sends messages 40 to the topic 32 of the topic-subscription structure 30. Upon receipt of each message 40, the topic 32 distributes that message 40 (or a copy of that message 40) to each subscription 34. The receivers 26 that are listening for messages 40 at their respective subscriptions 34 (as illustrated by the arrows 42 pointing from the receivers 26 to the subscriptions 34) then receive the messages 40 through their respective subscriptions 34.

To increase the current receiver capacity of the example electronic environment 20, control circuitry of the system 22 introduces one or more topic-subscription structures 30 without disconnecting or displacing any receivers 26. Further details of the capacity expansion process will now be provided with reference to FIGS. 2 through 5.

Figure 2:
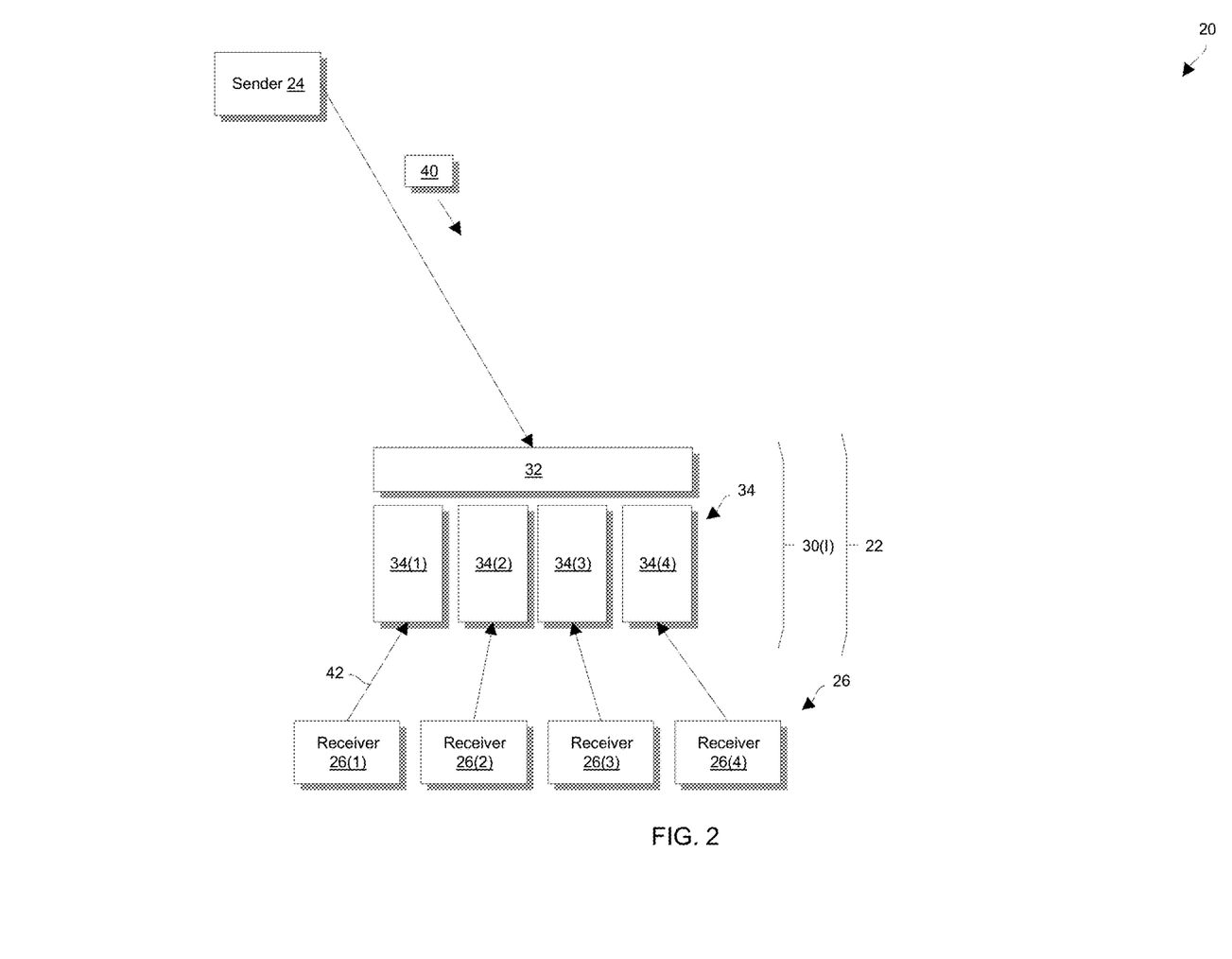
FIG. 2 is a block diagram of various components of the electronic environment during a first time period in accordance with some example embodiments.
Figure 3:
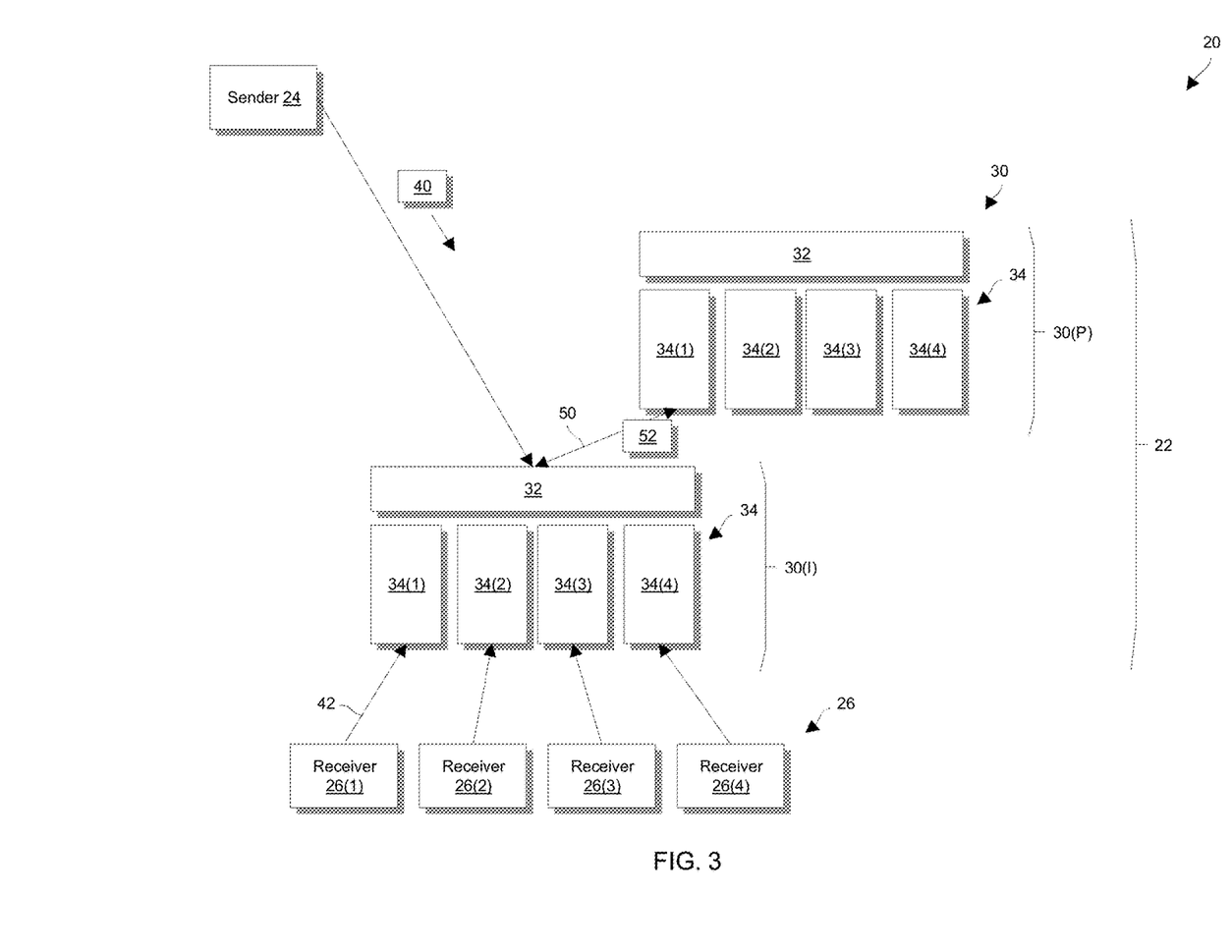
FIG. 3 is a block diagram of various components of the electronic environment during a second time period in accordance with some example embodiments.
Figure 4:
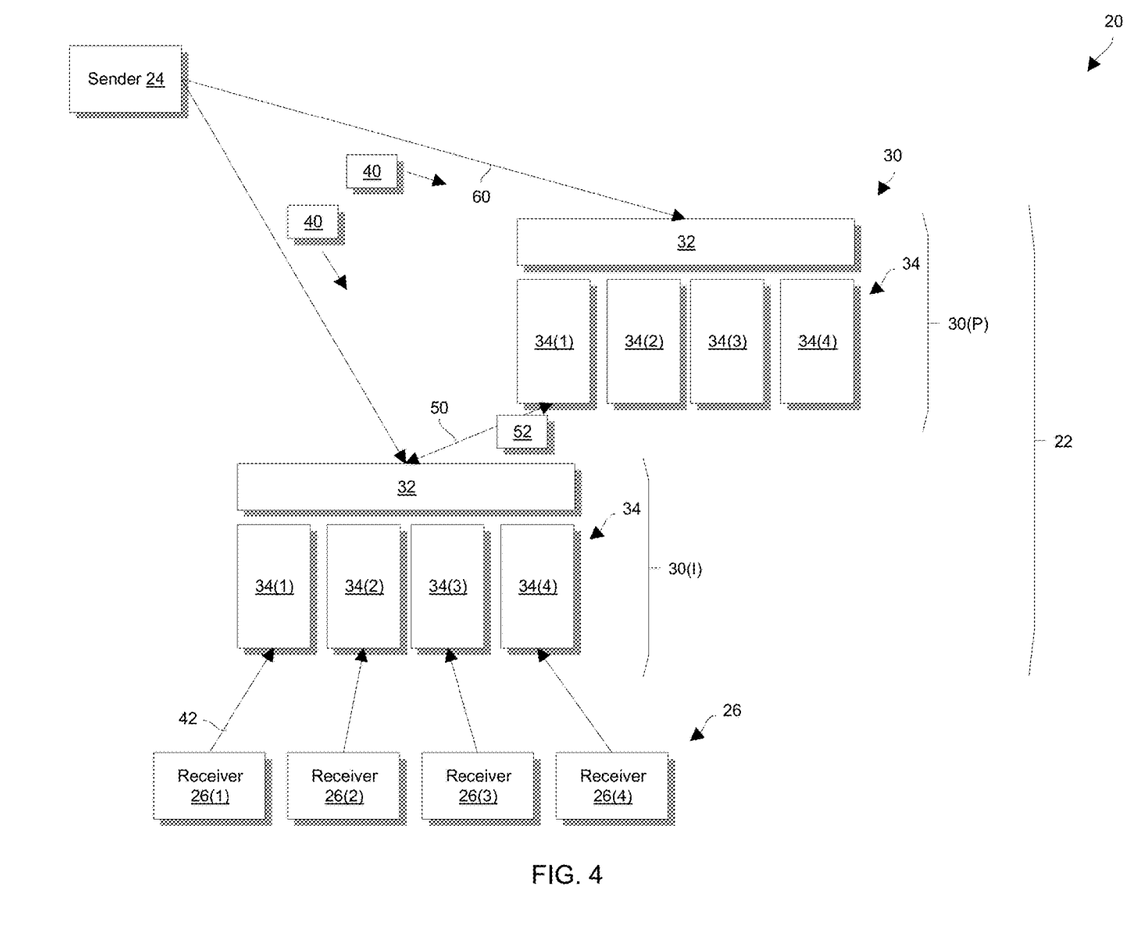
FIG. 4 is a block diagram of various components of the electronic environment during a third time period in accordance with some example embodiments.
Figure 5:
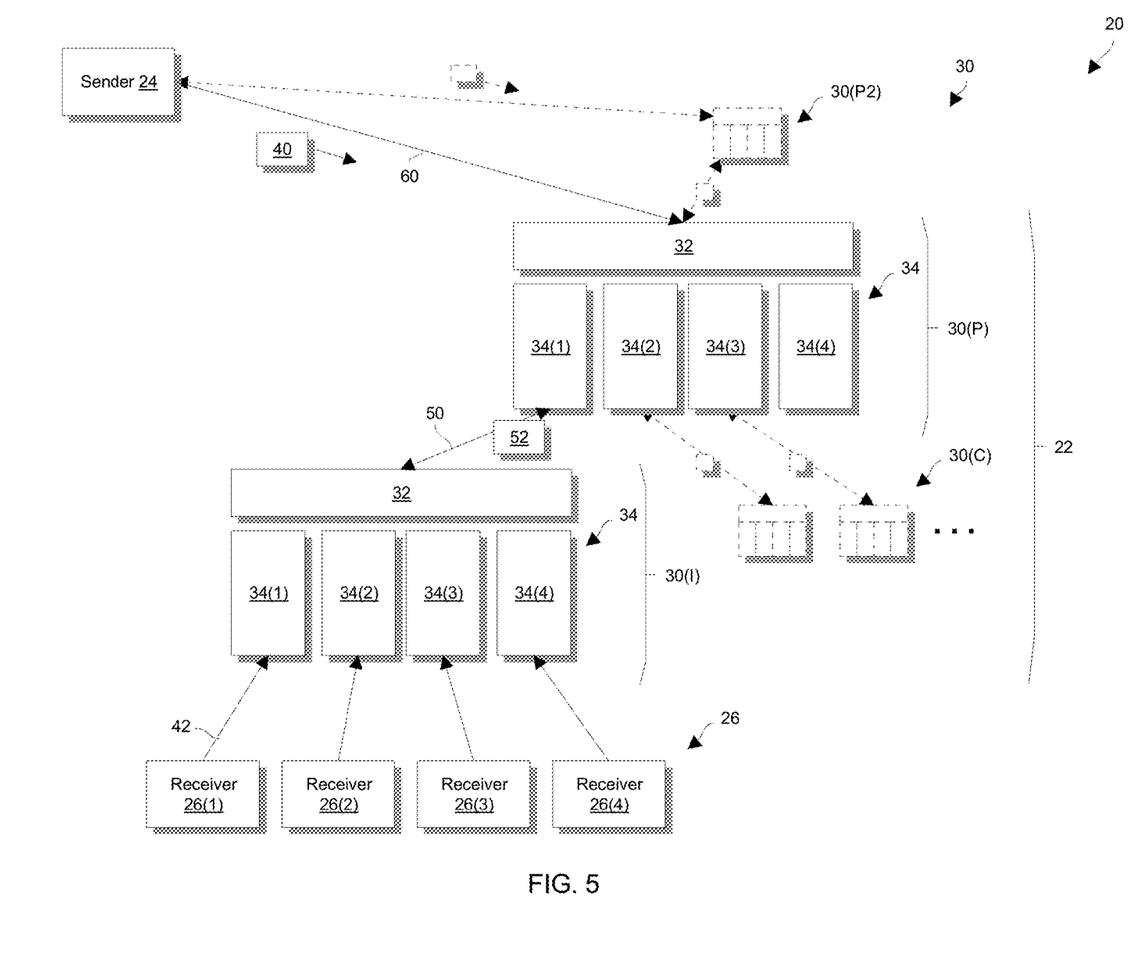
FIG. 5 is a block diagram of various components of the electronic environment during a fourth time period in accordance with some example embodiments.

FIGS. 2 through 5 show various details of a capacity expansion process for an example electronic environment 20 at different times. FIG. 2 shows the example electronic environment 20 at a first time period. FIG. 3 shows the example electronic environment 20 at a second time period after that shown in FIG. 2. FIG. 4 shows the example electronic environment 20 at a third time period after that shown in FIG. 3. FIG. 5 shows the example electronic environment 20 at a fourth time period after that shown in FIG. 4. By way of example only, the predefined maximum number of subscriptions 34 per topic-subscription structure 30 is four (4).

As shown in FIG. 2, the topic-subscription messaging system 22 includes an initial topic-subscription structure 30(I) that delivers messages 40 from one or more senders 24 and which may have been in operation for some time (one sender 24 is shown in FIGS. 2 through 5 for simplicity).

During this first time period, the system 22 may have had ample receiver capacity where new receivers 26 were added without any need to introduce more topic-subscription structures 30.

However, suppose that the maximum number of receivers 26 were added during the first time period and the initial topic-subscription structure 30(I) now supports the maximum number of receivers 26 (e.g., four). Accordingly, there are no available subscriptions 34 left in initial topic-subscription structure 30(I).

As shown in FIG. 3, to address this situation in a second time period that follows the first time period, control circuitry of the topic-subscription messaging system 22 introduces another topic-subscription structure 30(P) as a parent or master to the initial topic-subscription structure 30(I). Along these lines, a particular subscription 34(1) of the parent topic-subscription structure 30(P) is setup to channel messages from the parent topic-subscription structure 30(P) to the topic 32 of the initial topic-subscription structure 30(I), also see the arrow 50 in FIG. 3.

In accordance with some embodiments, the link 50 between the topic-subscription structures 30(P), 30(I) is created by a worker element of the topic-subscription messaging system 22. In these embodiments, the worker element creates a client 52 that listens to the subscription 34(1) of the parent topic-subscription structure 30(P) and relays any messages 40 from that subscription 34(1) to the topic 32 of the initial topic-subscription structure 30(I).

It should be understood that the link 50 is illustrated in FIG. 4 as a double arrow 50 because the client 52 listens to the subscription 34(1) of the parent topic-subscription structure 30(P) for messages 40 and forwards such messages 40 to the topic 32 of the initial topic-subscription structure 30(I). Other channeling mechanisms are suitable for use as well.

During the second time period, there is no displacement of any existing receivers 26. Rather, each subscription 34 of the initial topic-subscription structure 30(I) continues to receive messages 40 from the topic 32 of the initial topic-subscription structure 30(I) on behalf of a respective receiver 26 thus avoiding a situation in which a receiver 26 misses a message 40 due to disconnection. In turn, each receiver 26 receives messages 40 via listening to a respective subscription 34 of the initial topic-subscription structure 30(I).

As shown in FIG. 4, to utilize the newly introduced parent topic-subscription structure 30(P), the sender 24 is further configured to send messages 40 to the topic of the parent topic-subscription structure 30(P) (see the arrow 60 in FIG. 4). In some arrangements, for some period of time, the sender 24 may operate to send messages 40 to both the topic 32 of the initial topic-subscription structure 30(I) (e.g., to maintain stable operation) and the topic 32 of the parent topic-subscription structure 30(P) (e.g., to test and gain confidence regarding the newly introduced infrastructure). That is, the pathway 60 may be treated as an intended migration choice for the sender 24 but the system 22 may operate in this multi-path situation for an extended period of time without forcing the sender 24 to commit to exclusively using the path 60.

It should be understood that, since the receivers 26 were never disconnected from the system 22, the receivers 26 never miss messages 40 from the sender 24. To the contrary, any messages 40 that the sender 24 sends directly to the topic 32 of the initial topic-subscription structure 30(I) are conveyed to all of the receivers 26. Likewise, any messages 40 that the sender 24 sends to the topic 32 of the parent topic-subscription structure 30(P) are forwarded to the topic 32 of the initial topic-subscription structure 30(I) and nevertheless received by all of the receivers 26.

As shown in FIG. 5, when the sender 24 is ready to fully commit to using the parent topic-subscription structure 30(P) (e.g., perhaps after an extended period of testing), the sender 24 no longer sends messages 40 directly to the topic of the parent topic-subscription structure 30(P). Rather, the sender 24 sends messages 40 to the topic 32 of the parent topic-subscription structure 30(P).

It should be understood that the parent topic-subscription structure 30(P) provides flexibility for augmenting the receiver capacity to the topic-subscription messaging system 22. For example, new receivers 26 can listen directly to the subscriptions 34 of the parent topic-subscription structure 30(P). Alternatively, the control circuitry of the system 22 may introduce one or more child topic-subscription structures 30(C) which are essentially peers (or siblings) to the initial topic-subscription structure 30(I) (i.e., newly created clients listen to respective subscriptions for messages and forward the messages to the topics of the child topic-subscription structures) and new receivers 26 may listen to the subscriptions 34 of the newly introduced child topic-subscription structures 30(C) (see the topic-subscription structures 30(C) shown in phantom in FIG. 5).

Moreover, if the receiver capacity of the topic-subscription messaging system 22 needs to be increased further, the control circuitry of the system 22 may introduce another parent topic-subscription structure 30(P2) (see the topic-subscription structure 30(P2) shown in phantom in FIG. 5). Again, a new client 52 may listen to a subscription 34 of the newly introduced parent topic-subscription structures 30(P2) and forward messages to the parent topic-subscription structures 30(P) which is a now child of the parent topic-subscription structures 30(P2), and so on.

It should be appreciated that any message 40 that a sender 24 sends to the highest-level topic-subscription structure 30 is robustly and reliably distributed to all of the receivers 26 that access the system 22. Moreover, with the introduction of parent topic-subscription structures 30, new capacity is available for new receivers 26 without missing messages 40, and there is an opportunity to more quickly grow the subscription capacity of system 22 (i.e., in an exponential manner). Further details will now be provided with reference to FIG. 6.

Figure 6:
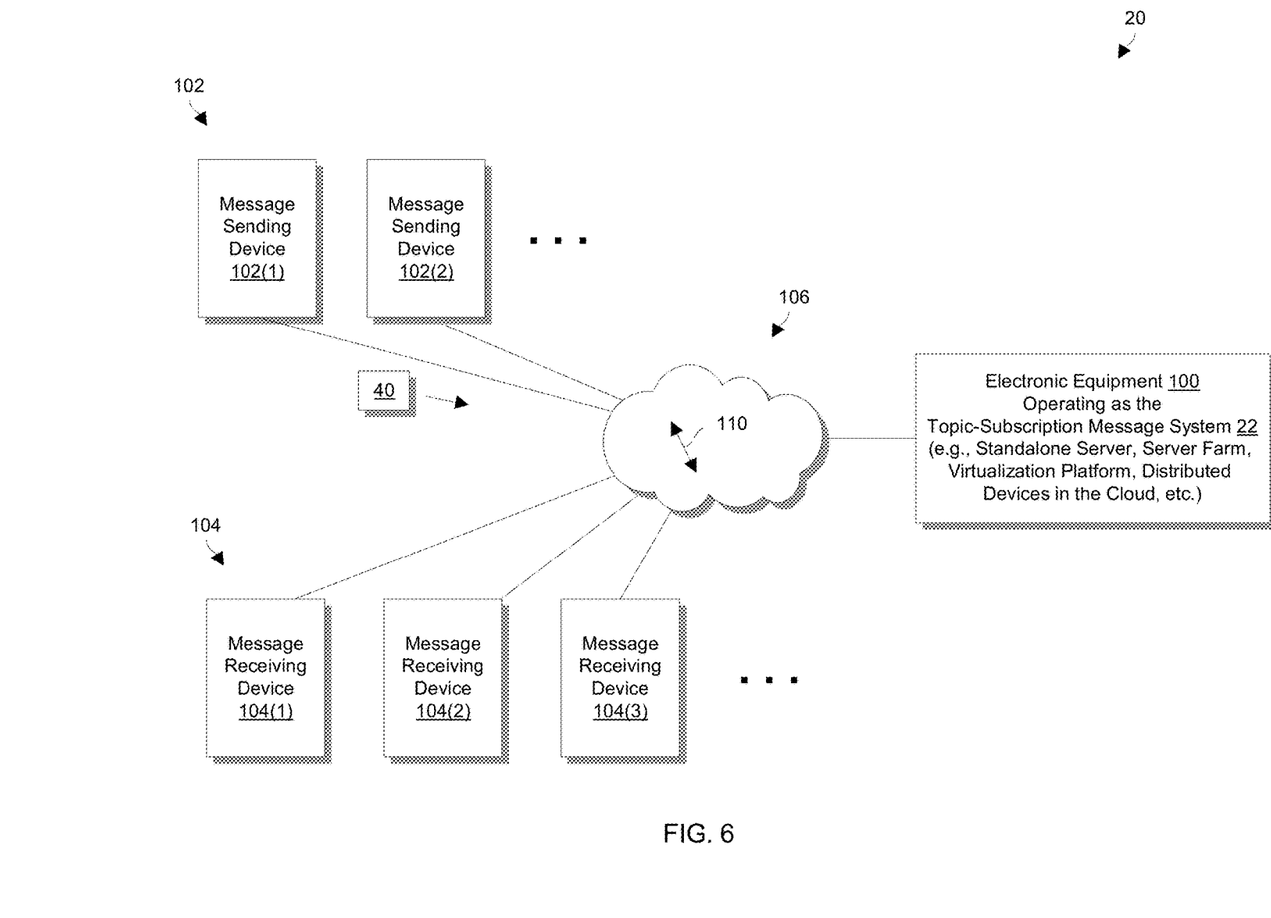
FIG. 6 is a block diagram of certain details of the electronic environment in accordance with some example embodiments.

FIG. 6 shows certain example details for the electronic environment 20 of FIG. 1. As shown in FIG. 6, the electronic environment 20 includes electronic equipment 100 that operates as the topic-subscription message system 22, message sending devices 102(1), 102(2), . . . (collectively, message sending devices 102), message receiving devices 104(1), 104(2), 104(3), . . . (collectively, message receiving devices 104), and a communications medium 106.

In accordance with some embodiments, the electronic equipment 100 is constructed and arranged to operate as the above-described topic-subscription message system 22. To this end, the electronic equipment 100 may operate under control of user input (e.g., responding to commands from one or more administrators, based on input from end-user customers, in response to events via automated scripts put in place by users, combinations thereof, etc.). Along these lines, the electronic equipment 100 may take the form of a standalone (or individual server), a server farm (e.g., a fleet of server apparatus), a virtualization platform, distributed devices in the cloud, combinations thereof, and so on. In some arrangements, the electronic equipment 100 includes hardware that provides sufficient resources for scalability, fault tolerance, mobility, and so on.

Each message sending device 102, in accordance with some embodiments, is constructed and arranged to operate as a sender which sends messages 40 to the electronic equipment 100 through the communications medium 106. To this end, the message sending devices 102 are capable of identifying particular topics 32 of the topic-subscription structures 30 of the topic-subscription message system 22 (also see the sender 24 in FIG. 1). Suitable message sending devices 102 include application servers, websites, central stations, user devices, and so on.

Each message receiving device 104, in accordance with some embodiments, is constructed and arranged to operate as a receiver which receives messages 40 via the electronic equipment 100. To this end, the message receiving devices 104 are capable of listening for messages 40 (or employing a client 52 to forward messages 40) from respective subscriptions 34 of the topic-subscription structures 30 of the topic-subscription message system 22 (also see the receivers 26 in FIG. 1). Suitable message receiving devices 104 include application servers, websites, central stations, user devices, and so on.

The communications medium 106, in accordance with some embodiments, is constructed and arranged to connect the various components of the electronic environment 20 together to enable these components to exchange electronic signals 110 such as messages 40 (e.g., see the double arrow 110). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, cellular communications, plain old telephone service (POTS) communications, combinations thereof, and so on.

During operation, the topic-subscription message system 22 formed by the electronic equipment 100 receives and distributes messages 40 from the message sending devices 102 in a topic-based manner. Accordingly, the message receiving devices 104 listen for messages 40 from respective subscriptions 34 to particular topics 32 in order to obtain such messages 40. Such operation provides robust and reliable communications even though the message sending devices 102 do not have knowledge about particular message receiving devices 104.

Additionally, the topic-subscription message system 22 formed by the electronic equipment 100 is able to increase capacity even though the system 22 may utilize topic-subscription structures 30 that impose a limit on the number of subscriptions 34 per structure 30 without disconnecting message receiving devices 104 from the system 22. As a result, the message receiving devices 104 do not miss any messages 40 from the message sending devices 102. Further details will now be provided with reference to FIG. 7.

Figure 7:
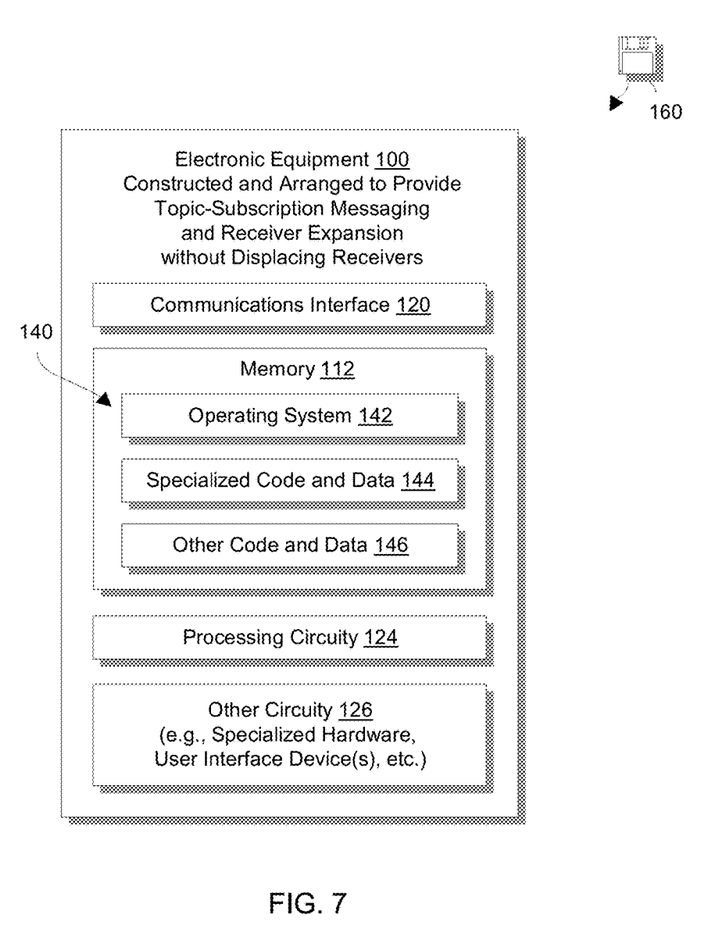
FIG. 7 is a block diagram of electronic equipment of the electronic environment in accordance with some example embodiments.

FIG. 7 shows example details for the electronic equipment 100 in accordance with some example embodiments. The electronic equipment 100 includes a communications interface 120, memory 122, processing circuitry 124, and other circuitry 126.

The communications interface 120 is constructed and arranged to connect the electronic equipment 100 to the communications medium 106 (FIG. 6). Accordingly, the communications interface 120 enables the electronic equipment 100 to communicate with the other components of the electronic environment 20. Such communications may be cable-based and/or wireless (i.e., IP-based, cellular, combinations thereof, and so on).

The memory 112 is intended to represent both volatile storage (e.g., DRAM, SRAM, etc.) and non-volatile storage (e.g., flash memory, magnetic disk drives, etc.). The memory 112 stores a variety of software constructs 140 including an operating system 142, a set of specialized applications and data 144, and other applications and data 146.

The processing circuitry 124 is constructed and arranged to operate in accordance with the various software constructs 140 stored in the memory 112. In particular, the processing circuitry 124, when executing the operating system 142, manages various resources of the electronic equipment 100 (e.g., memory allocation, processor cycles, etc.).

Additionally, the processing circuitry 124 operating in accordance with the set of specialized applications and data 144 forms specialized control circuitry to control operation of the above-described topic-subscription message system 22. To this end, the set of specialized applications and data 144 enables creation, operation, management, etc. of topic-subscription structures 30. In some embodiments, one or more of the structures 30 are instantiated by specialized control circuitry that is formed by the processing circuitry 124 running in accordance with the specialized applications and data 144. Such operation may utilize specialized data structures, object instances, virtualization, and so on. Moreover, the set of specialized applications and data 144 enables one or more human administrators (or users) to apply such structures 30 to various situations to perform useful work (e.g., distributing alerts, conveying critical notifications, communicating important commands and other information, and so on).

Furthermore, the processing circuitry 74 operating in accordance with the other applications and data 146 forms other specialized circuitry to perform other operations. For example the administrator may use monitor performance of the system 22, operate administrative tools, provide other services and other server-based operations, etc.

The other circuitry 126 is constructed and arranged to perform other operations. For example, the additional circuitry 126 may include a user interface for user input/output, specialized databases for enrolling customers/access control/security/etc., and so on.

It should be understood that the above-mentioned processing circuitry 124 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 160 is capable of delivering all or portions of the software to the electronic equipment 100. The computer program product 160 has a non-transitory and non-volatile computer readable medium that stores a set of instructions to control one or more operations of the electronic equipment 100. Examples of suitable computer readable storage media include tangible articles of manufacture and apparatus that store instructions in a non-volatile manner such as CD-ROM, flash memory, disk memory, tape memory, and the like. Further details will now be provided with reference to FIG. 8.

Figure 8:
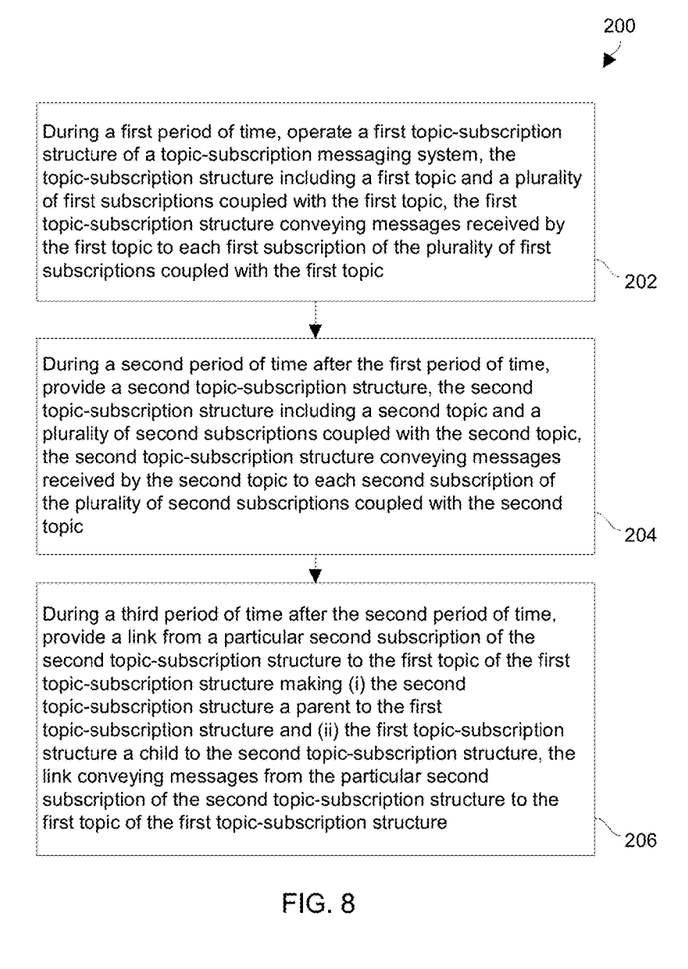
FIG. 8 is a flowchart of a procedure that is performed by certain circuitry of the electronic environment of FIG. 1.

FIG. 8 is a flowchart of a procedure 200 that is performed by control circuitry to increase capacity in a topic-subscription messaging system in accordance with certain example embodiments (also see FIGS. 6 and 7). Along these lines, the procedure 200 introduces a parent topic-subscription structure to an initial topic-subscription structure without disconnecting any receivers.

At 202, during a first period of time, the control circuitry operates a first topic-subscription structure of the topic-subscription messaging system (also see FIG. 2). The first topic-subscription structure includes a first topic and a plurality of first subscriptions coupled with the first topic. The first topic-subscription structure conveys messages received by the first topic to each first subscription of the plurality of first subscriptions coupled with the first topic.

At 204, during a second period of time after the first period of time, the control circuitry provides a second topic-subscription structure (also see FIG. 3). The second topic-subscription structure includes a second topic and a plurality of second subscriptions coupled with the second topic. The second topic-subscription structure conveys messages received by the second topic to each second subscription of the plurality of second subscriptions coupled with the second topic.

At 206, during a third period of time after the second period of time, the control circuitry provides a link from a particular second subscription of the second topic-subscription structure to the first topic of the first topic-subscription structure making (i) the second topic-subscription structure a parent to the first topic-subscription structure and (ii) the first topic-subscription structure a child to the second topic-subscription structure (also see the arrow 50 FIGS. 2-5). The link conveys messages from the particular second subscription of the second topic-subscription structure to the first topic of the first topic-subscription structure.

Once the link is in place, any messages received by the second topic-subscription structure are forwarded to the first topic-subscription structure. For example, with reference to FIG. 4, a client may be configured to listen for messages on the subscription 34(1) of the parent (or master) topic-subscription structure 30(P) and forward such messages to the topic 32 of the child topic-subscription structure 30(4 As a result, all receivers 26 are able to receive the message and none of the receivers needed to be displaced.

Furthermore, with the parent topic-subscription structure in place, additional receiver capacity is readily available. Along these lines, new receivers may be added directly to the parent topic-subscription structure. Alternatively, one or more child topic-subscription structures may be added from the parent topic-subscription structure (e.g., in anticipation of new receivers, in an as-needed manner, etc.).

As described above, improved techniques are directed to increasing capacity of a topic-subscription messaging system 22 via introducing a parent topic-subscription structure 30(P) ahead of an initial topic-subscription structure 30(I). Here, a subscription 34 of the parent topic-subscription structure 30(P) is setup to channel messages 40 sent to the topic 32 of the parent topic-subscription structure 30(P) to the topic 32 of the initial topic-subscription structure 30(I). In such a situation, there is no displacement of any existing receivers 26 at any time. Rather, each subscription 34 of the initial topic-subscription structure 30(I) continues to receive messages 40 from the topic 32 of the initial topic-subscription structure 30(I) on behalf of a respective receiver 26 thus avoiding a situation in which a receiver 26 misses a message 40. Any message 40 that a sender 24 sends to either the topic 32 of the initial topic-subscription structure 30(I) or to the topic 32 of the parent topic-subscription structure 30(P) is now distributed to all of the receivers 26. Moreover, with the parent topic-subscription structure 30(P) now in place, new capacity is available for new receivers 26, and there is an opportunity to more quickly grow the subscription capacity of system 22 (i.e., exponentially rather than linearly).

Additionally, one should appreciate that this above-described techniques amount to more than simply providing topic-subscription structures 30 to increase capacity. Rather, in accordance with certain embodiments, the techniques involve purposeful insertion of a parent topic-subscription structure 30(P) to alleviate displacement of a receiver 26 that could otherwise cause the receiver 26 to miss a message 40. Moreover, such operation enables scaling capacity in an exponential manner. Thus, such techniques clearly provide an improvement to the technology.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on.

Additionally, one should appreciate that in accordance with certain example embodiments at least some of the improvements disclosed herein provide for a rich and robust migration process for topic/subscription systems having receiver limit restrictions. Along these lines, these example embodiments make possible migrating a distributed system using topic/subscriptions when the system has a limit of how many subscriptions are available for a topic-subscription structure (or simply topic).

In accordance with some example embodiments, a scenario exists where a topic/subscription approach is used to send one-way notifications (e.g., a message is sent to a topic, which distributes that message to all subscriptions). Suppose that there is a limitation of how many subscriptions can a topic have, e.g, N. In this situation, the migration procedures is able to add a second layer of topics (e.g., topic/subscription structures), in which a primary topic sends messages and secondary layer of topics is used to forward message from the primary topic to the secondary layer of topics, those growing the limit of subscriptions to N times N.

In some embodiments, the system may have two deployments: a stable one and an upgraded one. New code is deployed to the new one, and customers are moved to it gradually, after carefully test the new code. So, at any point, the system is able to satisfy a request for stable and/or new deployments, and the subscription operations work without interruption.

In accordance with some embodiments, the considered operations are:
1. CRUD (Create, read, update, delete) operations for subscriptions. For some scenarios only the Create operation is relevant.
2. Notifications sent to the topic for distribution to all subscriptions.

The stable deployment contains a service (such as a Rest API, HTTP based service) that provides both operations. When a notification is needed, the service sends a message to the existing topic, which forwards it to all existing subscriptions.

In accordance with some embodiments, the solution listed here is as follows:
1. Create a new topic above the existing topic, with a single subscription.
2. Deploy a worker device (or simply worker) that will create a client or listener for said subscription and configure the client to forward messages from the subscription of the new topic to the existing topic.
3. Modify the service creation action for subscriptions to:
   a. Keep a reference of which topic is being used to create new subscriptions. On migration, this is set to the initial existing topic.
   b. If the existing topic has enough room, the subscription is created there.
   c. Otherwise, the service will create a new topic, and the subscription is created there. Also the service will notify the worker that a new topic needs forwarding of messages.

In connection with these embodiments, a request to create subscriptions to the stable deployment will keep working, since both old and new deployments are creating subscriptions in the same topic. The migration process is assumed to be started before the limit in the first topic is reached, thus giving time for all customers to be moved to the new release.

Also, notifications sent to the old release will keep working, since the old service is still sending the messages to the initial topic. Notifications sent to the new release service are sent first to the new (second layer) topic. Then, the worker picks them up and forwards them to the old/existent topic. This process will be the only one, after all customers are in the new release. Such modifications and enhancements are intended to belong to various embodiments of the disclosure.

What is claimed is:

1. A method of increasing capacity in a topic-subscription messaging system, the method comprising:
   during, a first period of time, operating a first topic-subscription structure of the topic-subscription messaging system, the first topic-subscription structure including a first topic and a plurality of first subscriptions coupled with the first topic, the first topic-subscription structure conveying messages received by the first topic to each first subscription of the plurality of first subscriptions coupled with the first topic;
   during a second period of time after the first period of time, providing a second topic-subscription structure, the second topic-subscription structure including a second topic and a plurality of second subscriptions coupled with the second topic, the second topic-subscription structure conveying messages received by the second topic to each second subscription of the plurality of second subscriptions coupled with the second topic; and
   during a third period of time after the second period of time, providing a link from a particular second subscription of the second topic-subscription structure to the first topic of the first topic-subscription structure making (i) the second topic-subscription structure a parent to the first topic-subscription structure and (ii) the first topic-subscription structure a child to the second topic-subscription structure, the link conveying messages from the particular second subscription of the second topic-subscription structure to the first topic of the first topic-subscription structure, wherein providing the link from the particular second subscription of the second topic-subscription structure to the first topic of the first topic-subscription structure includes:
   detecting, as a trigger event to increase capacity in the topic-subscription messaging system, that a number of first subscriptions of the first topic-subscription structure has reached a predefined subscription limit, and
   in response to the trigger event, operating a client that (i) listens for messages conveyed to the particular second subscription and (ii) forwards the messages conveyed to the particular second subscription to the first topic of the first topic-subscription structure.

2. The method as in claim 1 wherein operating the first topic-subscription structure of the topic-subscription messaging system during the first time period includes: receiving, by the first topic-subscription structure, a particular message from a sender device, and distributing, by the first topic-subscription structure, copies of the particular message through each first subscription of the first topic-subscription structure.

3. The method as in claim 2 wherein distributing the copies of the particular message through each first subscription of the plurality of first subscriptions includes: for each first subscription of the plurality of first subscriptions, operating a respective client that (i) listens for messages conveyed to that first subscription and (ii) forwards the messages conveyed to that first subscription to a respective receiver.

4. The method as in claim 2, further comprising: during a fourth period of time after the third period of time, operating the first and second topic-subscription structures of the topic-subscription messaging system to distribute messages from the sender device to a plurality of receivers.

5. The method as in claim 4 wherein operating the first and second topic-subscription structures of the topic-subscription messaging system during the fourth time period includes:
   receiving, by the second topic-subscription structure, another message from the sender device, and
   distributing, by the second topic-subscription structure, copies of the other message through each second subscription of the second topic-subscription structure; and
   wherein, when the second topic-subscription structure receives the other message and distributes the copies of the other message, the first topic-subscription structure receives a copy of the other message from the particular second subscription of the second topic-subscription structure via the link and distributes further copies of the other message through each first subscription of the plurality of first subscriptions.

6. The method as in claim 5 wherein distributing the copies of the other message through each second subscription of the second topic-subscription structure includes:
   for each second subscription of the plurality of second subscriptions, operating a respective client that (i) listens for messages conveyed to that second subscription and (ii) forwards the messages conveyed to that second subscription to a respective receiver.

7. The method as in claim 5 wherein operating the first and second topic-subscription structures of the topic-subscription messaging system during the fourth time period further includes:
   receiving, by the first topic-subscription structure, a third message from the sender device and
   distributing copies of the third message through each first subscription of the first topic-subscription structure, the third message circumventing the second topic-subscription structure.

8. The method as in claim 7 wherein distributing the copies of the third message through each first subscription of the first topic-subscription structure includes:
   for each first subscription of the plurality of first subscriptions, operating a respective client that (i) listens for messages conveyed to that first subscription and (ii) forwards the messages conveyed to that first subscription to a respective receiver.

9. The method as in claim 1, further comprising: providing a third topic-subscription structure, the third topic-subscription structure including a third topic and a plurality of third subscriptions coupled with the third topic, the third topic-subscription structure conveying messages received by the third topic to each third subscription of the plurality of third subscriptions coupled with the third topic; and
   providing another link from another second subscription of the second topic-subscription structure to the third topic of the third subscription structure making (i) the second topic-subscription structure a parent to the third topic-subscription structure and (ii) the third topic-subscription structure a child to the second topic-subscription structure, the other link conveying messages from the other second subscription of the second topic-subscription structure to the third topic of the third subscription structure.

10. The method as in claim 9, further comprising: during a fourth period of time after the third period of time, operating the first, second, and third topic-subscription structures of the topic-subscription messaging system to distribute messages from a sender device to a plurality of receivers.

11. The method as in claim 10 wherein operating the first, second, and third topic-subscription structures of the topic-subscription messaging system during the fourth time period includes:
   receiving, by the second topic-subscription structure, a particular message from the sender device, and
   distributing, by the second topic-subscription structure, copies of the particular message through each second subscription of the second topic-subscription structure; and
   wherein, when the second topic-subscription structure receives the particular message and distributes the copies of the particular message, (i) the first topic-subscription structure receives a copy of the particular message from the particular second subscription of the second topic-subscription structure via the link and distributes further copies of the particular message through each first subscription of the plurality of first subscriptions, and (ii) the third topic-subscription structure receives another copy of the particular message from the other second subscription of the second topic-subscription structure and distributes further copies of the particular message through each third subscription of the plurality of third subscriptions.

12. The method as in claim 11 wherein distributing the copies of the particular message through each second subscription of the second topic-subscription structure includes:
   for each second subscription of the plurality of second subscriptions, operating a respective client that (i) listens for messages conveyed to that second subscription and (ii) forwards the messages conveyed to that second subscription to a respective receiver.

13. The method as in claim 1, further comprising:
   providing a third topic-subscription structure, the third topic-subscription structure including a third topic and a plurality of third subscriptions coupled with the third topic, the third topic-subscription structure conveying messages received by the third topic to each third subscription of the plurality of third subscriptions coupled with the third topic; and
   providing another link from a particular third subscription of the third topic-subscription structure to the second topic of the second topic-subscription structure making (i) the third topic subscription structure a parent to the second topic-subscription structure and (ii) the second topic-subscription structure a child to the third topic-subscription structure, the other link conveying messages from the particular third subscription of the third subscription structure to the second topic of the second topic-subscription structure.

14. The method as in claim 13, further comprising:
   during a fourth period of time after the third period of time, operating the first, second, and third topic-subscription structures of the topic-subscription messaging system to distribute messages from a sender device to a plurality of receivers.

15. The method as in claim 14 wherein operating the first, second, and third topic-subscription structures of the topic-subscription messaging system during the fourth time period includes:
   receiving, by the third topic-subscription structure, a particular message from the sender device, and distributing, by the third topic-subscription structure, copies of the particular message through each third subscription of the third topic-subscription structures and
   wherein, when the third topic-subscription structure receives the particular message and distributes the copies of the particular message, (i) the second topic-subscription structure receives a copy of the particular message from the particular third subscription of the third topic-subscription structure via the other link and distributes further copies of the particular message through each second subscription of the plurality of second subscriptions, and (ii) the first topic-subscription structure receives a further copy of the particular message from the particular second subscription of the second topic-subscription structure and distributes further copies of the particular message through each first subscription of the plurality of first subscriptions.

16. The method as in claim 15 wherein distributing the copies of the particular message through each third subscription of the third topic-subscription structure includes:
   for each third subscription of the plurality of third subscriptions, operating a respective client that (i) listens for messages conveyed to that third subscription and (ii) forwards the messages conveyed to that third subscription to a respective receiver.

17. The method as in claim 1, further comprising:
   prior to the third period of time, adding first subscriptions to the first topic-subscription structure while the number of first subscriptions of the first topic-subscription structure is less than or equal to the predefined subscription, limit, each first subscription communicating with a respective client that (i) listens for messages conveyed to that first subscription and (ii) forwards the conveyed messages to a respective receiver.

18. A computer program product having a non-transitory computer readable medium that stores a set of instructions to increase capacity in a topic-subscription messaging system; the set of instructions, when carried out by computerized circuitry, causing the computerized circuitry to perform a method of:

during a first period of time, operating a first topic-subscription structure of the topic-subscription messaging system, the first topic-subscription structure including a first topic and a plurality of first subscriptions coupled with the first topic, the first topic-subscription structure conveying messages received by the first topic to each first subscription of the plurality of first subscriptions coupled with the first topic;

during a second period of time after the first period of time, providing a second topic-subscription structure, the second topic-subscription structure including a second topic and a plurality of second subscriptions coupled with the second topic, the second topic-subscription structure conveying messages received by the second topic to each second subscription of the plurality of second subscriptions coupled with the second topic; and during a third period of time after the second period of time, providing a link from a particular second subscription of the second topic-subscription structure to the first topic of the first topic-subscription structure making (i) the second topic-subscription structure a parent to the first topic-subscription structure and (ii) the first topic-subscription structure a child to the second topic-subscription structure, the link conveying messages from the particular second subscription of the second topic-subscription structure to the first topic of the first topic-subscription structure, wherein providing the link from the particular second subscription of the second topic-subscription structure to the first topic of the first topic-subscription structure includes:

detecting, as a trigger event to increase capacity in the topic-subscription messaging system, that a number of first subscriptions of the first topic-subscription structure has reached a predefined subscription limit, and in response to the trigger event, operating a client that (i) listens for messages conveyed to the particular second subscription and (ii) forwards the messages conveyed to the particular second subscription to the first topic of the first topic-subscription structure.

19. An electronic apparatus, comprising:
an interface;
memory; and
control circuitry coupled to the interface and the memory, the memory storing instructions that, when carried out by the control circuitry, cause the control circuitry to:

during a first period of time, operate a first topic-subscription structure of the topic-subscription messaging system, the first topic subscription structure including a first topic and a plurality of first subscriptions coupled with the first topic, the first topic-subscription structure conveying messages received by the first topic to each first subscription of the plurality of first subscriptions coupled with the first topic, during a second period of time after the first period of time, provide a second topic-subscription structure, the second topic-subscription structure including a second topic and a plurality of second subscriptions coupled with the second topic, the second topic-subscription structure conveying messages received by the second topic to each second subscription of the plurality of second subscriptions coupled with the second topic, and during a third period of time after the second period of time, provide a link from a particular second subscription of the second topic-subscription structure to the first topic of the first topic-subscription structure making (i) the second topic-subscription structure a parent to the first topic-subscription structure and (ii) the first topic-subscription structure a child to the second topic-subscription structure, the link conveying messages from the particular second subscription of the second topic-subscription structure to the first topic of the first topic-subscription structure;

wherein the control circuitry, when providing, the link from the particular second subscription of the second topic-subscription structure to the first topic of the first topic-subscription structure, is constructed and arranged to:

detect, as a trigger event to increase capacity in the topic-subscription messaging system, that a number of first subscriptions of the first topic-subscription structure has reached a predefined subscription limit, and in response to the trigger event, operate a client that (i) listens for messages conveyed to the particular second subscription and (ii) forwards the messages conveyed to the particular second subscription to the first topic of the first topic-subscription structure.

20. The computer program product as in claim 18, wherein the method further comprises:

prior to the third period of time, adding first subscriptions to the first topic-subscription structure while the number of first subscriptions of the first topic-subscription structure is less than or equal to the predefined subscription limit, each first subscription communicating with a respective client that (i) listens for messages conveyed to that first subscription and (ii) forwards the conveyed messages to a respective receiver.

* * * * *